US009656202B2

(12) United States Patent
Scholten et al.

(10) Patent No.: US 9,656,202 B2
(45) Date of Patent: May 23, 2017

(54) METHOD AND DEVICE FOR SEPARATING A GAS MIXTURE BY MEANS OF PRESSURE SWING ADSORPTION

(71) Applicant: Green Vision Holding B. V., Arnhem (NL)

(72) Inventors: Anton Scholten, Apeldoorn (NL); Gerard Westendorp, Zetten (NL)

(73) Assignee: Green Vision Holding B.V., Arnhem (NL)

( * ) Notice: Subject to any disclaimer, the term of this patent is extended or adjusted under 35 U.S.C. 154(b) by 0 days.

(21) Appl. No.: 14/758,320

(22) PCT Filed: Dec. 24, 2013

(86) PCT No.: PCT/NL2013/050958
§ 371 (c)(1),
(2) Date: Jun. 29, 2015

(87) PCT Pub. No.: WO2014/104891
PCT Pub. Date: Jul. 3, 2014

(65) Prior Publication Data
US 2015/0328579 A1    Nov. 19, 2015

(30) Foreign Application Priority Data
Dec. 28, 2012    (NL) ..................................... 2010072

(51) Int. Cl.
*B01D 53/047*        (2006.01)
*B01D 53/053*        (2006.01)
*B01D 53/14*         (2006.01)
(52) U.S. Cl.
CPC ......... *B01D 53/053* (2013.01); *B01D 53/047* (2013.01); *B01D 53/1475* (2013.01);
(Continued)

(58) Field of Classification Search
CPC ........................... B01D 53/047; B01D 53/053; B01D 53/1475; B01D 2256/16;
(Continued)

(56) References Cited

U.S. PATENT DOCUMENTS 4,539,020 A * 9/1985 Sakuraya ............. B01D 53/047
                                                        95/101
5,154,736 A * 10/1992 Mifflin ....................... C01B 3/34
                                                        95/100
(Continued)

FOREIGN PATENT DOCUMENTS

DE           69935838          1/2008
EP           0923976           6/1999
(Continued)

OTHER PUBLICATIONS

PCT/NL2013/050958, International Search Report and Written Opinion, Apr. 22, 2014, 10 pages.

*Primary Examiner* — Frank Lawrence
(74) *Attorney, Agent, or Firm* — Michael Best & Friedrich, LLP

(57) ABSTRACT

Method for separating a gas mixture according to a pressure swing adsorption process (PSA process), and apparatus for performing this method, the apparatus comprising a plurality of vessels, wherein each vessel has at least one inlet and one outlet, an adsorbent mass is provided in each of said vessels for adsorbing at least one gas component, and the inlet of each of said vessels is connected to a storage vessel for an off-gas, and the inlet of each of said vessels and the storage vessel are further connected to an off-gas consuming device.

15 Claims, 2 Drawing Sheets

(52) U.S. Cl.
CPC .... *B01D 2256/16* (2013.01); *B01D 2259/402* (2013.01); *B01D 2259/40009* (2013.01); *Y02C 10/06* (2013.01)

(58) Field of Classification Search
CPC .... B01D 2259/40009; B01D 2259/402; Y02C 10/06; Y02C 10/08
USPC .......... 95/19, 96–98, 104, 105; 96/113, 116, 96/121
See application file for complete search history.

(56) References Cited

U.S. PATENT DOCUMENTS

| | | | |
|---|---|---|---|
| 6,315,818 B1 * | 11/2001 | Monereau | B01D 53/047 95/105 |
| 7,452,393 B2 | 11/2008 | Engler | |
| 8,034,164 B2 | 10/2011 | Lomax | |
| 8,974,575 B2 * | 3/2015 | Utaki | B01D 53/053 585/820 |
| 2016/0175761 A1 * | 6/2016 | Shimizu | C01B 3/56 95/96 |

FOREIGN PATENT DOCUMENTS

| | | | |
|---|---|---|---|
| GB | 2227685 A * | 8/1990 | |
| JP | 2005289730 | 10/2005 | |

* cited by examiner

METHOD AND DEVICE FOR SEPARATING A GAS MIXTURE BY MEANS OF PRESSURE SWING ADSORPTION

BACKGROUND OF THE INVENTION

The invention relates to a method for separating a gas mixture according to a pressure swing adsorption process (PSA process), including the step of separating the gas mixture by adsorbing at least one gas component in an adsorbent mass provided in each vessel of a plurality of vessels, each vessel having at least one inlet and one outlet.

US 2009/0020014 A1 discloses a PSA system having four adsorbent vessels. These adsorbent vessels are connected to four parallel flow manifolds, namely a feed manifold, a product manifold, a waste gas manifold and an equalization and purge manifold. These vessels are provided with corresponding raw gas feed valves and equalization and purge valves. The mechanical arrangement disclosed thus possesses four vessels with four valves each.

A PSA system is used for instance to purify hydrogen gas in the production of pure hydrogen (the product gas) from synthesis gas or reformate (the feed gas). The pressure swing adsorption process is based on the difference in adsorption at high pressure and at low pressure for the different components on the specific absorbent. A high amount of compounds like methane, carbon dioxide, carbon monoxide and nitrogen, whereas only a relatively small amount of hydrogen will be adsorbed.

In a prior art PSA system, in each of the vessels seven steps are to be distinguished, however out of phase:

(i) production, (ii) equalization (pressure reduction), (iii) addition of purge gas, (iv) blow-down, (v) reception of purge gas, (vi) equalization (pressure increase), (vii) final re-pressurization.

On purifying hydrogen gas in a four vessel prior art PSA system, when the first vessel (vessel 1) is in the production step, the gas mixture flows through a cleaned adsorbent bed at high pressure. The compounds other than hydrogen are adsorbed in the adsorbent bed. Part of the produced pure hydrogen is used for the final re-pressurization of the next vessel in production (vessel 2). When the adsorbent bed is partially saturated, the adsorbent bed is disconnected from the feed stream, and vessel 2 takes over production. The product side of vessel 1 contains still pure hydrogen, the feed side contains the contaminated hydrogen.

Vessel 1 is then switched to the equalization phase. In this phase the clean sides of vessel 1 and the third vessel (vessel 3) are connected. Vessel 3 is the vessel that will take over hydrogen production from vessel 2. Vessel 3 has been cleaned, but is still at low pressure. Clean hydrogen will flow from the high pressure vessel 1 to the low pressure vessel 3 until both vessels have (almost) the same pressure. As a result, the hydrogen released during the depressurization of vessel 1 is not lost, but is utilized for the pressurization of vessel 3.

Next, the vessel 1 provides gas to purge the fourth vessel (vessel 4). Vessel 4 is at low pressure, and therefore the adsorbed gasses will desorb in an effort to restore the equilibrium pressure corresponding to the amount of the adsorbed gas adsorbed to the absorbent. Flushing vessel 4 with pure hydrogen from the product side of vessel 1 will further reduce the partial pressure of the adsorbed contaminants. Vessel 4 will be cleaner when this proceeds at a lower pressure.

Next, vessel 1 is going through the blow-down phase. In this phase the pressure is reduced by removing gas from the feed side. In this phase already contaminants are removed from vessel 1. The adsorbed gasses at the adsorbent are in equilibrium at the adsorption pressure. Reducing the pressure will result in desorption of the contaminants in an attempt to keep the absolute partial pressure of the contaminants constant.

After the blow-down phase, vessel 1 is purged using pure hydrogen from vessel 2. Usually this is done by opening valves, and because of the much higher pressure of vessel 2, vessel 1 will experience a pressure hill with a maximum pressure depending on valve sizes and adsorbent bed packing and size somewhere between the pressure of vessel 2 and vessel 1 at the start of this phase. The partial pressure of the contaminants in vessel 1 is now reduced to a very low level due to the low pressure and the low concentration in the purge gas. At the end of the purge the clean-up of vessel 1 is finished.

Now the pressure in vessel 1 has to be increased to the production pressure. The first step of the pressure increase is the equalization. In this step vessel 1 receives pure hydrogen from the product side of vessel 3. Roughly 50% of the required pressure increase is effectuated in this step.

The final step in the cycle is the final re-pressurization. In this phase a part of the hydrogen that is purified by vessel 4 is fed to the product side of vessel 1, until the production pressure is reached. Vessel 1 is now ready to start production again.

It is perceived to be a drawback of purifying hydrogen gas in a prior art PSA system, that the gasses produced in the blow-down and the purge phase still contain a significant amount of hydrogen and possibly methane and carbon monoxide, depending on the hydrogen production method.

Usually these gasses are used in a burner. Often a burner that supplies the heat for the steam reforming reaction or for steam generation or a combination of these. These burners however need a continuous flow of fuel, where the availability of these flows is very discontinuous. This is usually handled by a large off-gas buffer vessel. All rejected gas from the blow-down and purge are gathered in this off-gas vessel. The burner consumes these gasses from the off-gas vessel, which however causes the pressure in the off-gas-vessel to fluctuate. This means that the lowest pressure for the end of the blow-down and for the complete purge is the pressure of the off-gas vessel at that point in the cycle. To limit this effect the off-gas vessel can be designed very big, but that is expensive.

DE 69935838 T2 discloses a pressure swing adsorption (PSA) gas separation process which comprises delivery of adsorber residual gas to different pressure distribution pipes during different pressure stages of adsorber decompression/regeneration. The PSA gas mixture separation process comprises delivering residual gas from an adsorber to: (a) a first residual gas distribution pipe under a first distribution pressure during a first decompression/regeneration stage, in which the adsorber pressure is within a first intermediate pressure range between the high pressure and the low pressure of the cycle; and (b) to a second residual gas distribution pipe under a lower second distribution pressure during a second decompression/regeneration stage, in which the adsorber pressure is within a second pressure range between the low pressure of the first pressure range and the low pressure of the cycle.

According to this prior art process, the residual gas is stored in either a buffer vessel at the first distribution pressure, or in a buffer vessel at the second distribution pressure, and the adsorber pressure has a lower limit which is given by the pressure in the actual buffer vessel.

For a proper efficiency of the process, it is required that in the step (v) described above, during which purge gas is received in the adsorber, the adsorber pressure is very low. Therefore, the pressure in the actual buffer vessel constitutes serious obstacle for the release of residual gas from the adsorber.

JP 2005 289730 A discloses a method and an apparatus for producing hydrogen for producing high purity product hydrogen from a hydrogen-enriched gas by repeating a hydrogen taking-out step for taking out the high purity product hydrogen by adsorbing impurities in the hydrogen-enriched gas onto the adsorbing agent while maintaining the inside of the hydrogen purification unit in a pressurized state. The process comprises an off-gas taking-out step for taking out off-gas by desorbing the impurities from the adsorbing agent while maintaining the inside of the hydrogen purification unit in a reduced pressure state, and a cleaning step for cleaning the adsorbing agent by high purity cleaning hydrogen while maintaining the inside of the hydrogen purification unit in a reduced pressure state, after completion of the hydrogen taking-out step. A hydrogen recovering step for recovering the high purity hydrogen remaining in the hydrogen purification unit as the cleaning hydrogen is performed by the reduction of the pressure in the hydrogen purification unit, and after completion of the hydrogen recovering step, the off-gas taking-out step is performed.

In this prior art process, residual gas is stored in a buffer vessel, and the adsorber pressure has a lower limit which is given by the pressure in this buffer vessel.

SUMMARY OF THE INVENTION

As explained above, said pressure in the buffer vessel constitutes serious obstacle for the release of residual gas from the adsorber.

It is an object of the invention to provide a method for pressure swing adsorption, according to which a burner can be fed with off-gas originating from said process, without pressure fluctuations being caused in an off-gas vessel.

Moreover, it is to be achieved that in the step (v) described above, during which purge gas is received in the adsorber, the adsorber pressure is very low.

This object is achieved with a process of the type stated in the preamble, further comprising the step of storing off-gas from said process into an off-gas vessel, wherein in each of said vessels the following steps are to be distinguished: (i) admitting the gas mixture for a specified period into a first vessel via an inlet of said vessel, and releasing a separated product gas via an outlet of said vessel, to be followed by admitting the gas mixture into a second vessel while continuing the releasing of product gas from the first vessel, to be followed by (ii) releasing purge gas from the first vessel via its outlet, (iii) releasing off-gas from the first vessel via its inlet and admitting at least part of the off-gas into the off-gas vessel, (iv) admitting purge gas into the first vessel via its outlet, and releasing off-gas from said vessel via its inlet, (v) admitting a separated product gas into the first vessel until the pressure in the first vessel has reached a predetermined value, after which admitting of the gas mixture into the first vessel begins, and the steps are to be repeated beginning with the step (i), in which process during at least one of the steps (iii) and (iv) at least part of the off-gas from the first vessel is released directly to the off-gas consuming device, which process, according to the invention, is characterized by (a) connecting, in a first state in which $p_i > p_o + \Delta$ and $p_i > p_b$, each of the vessels directly to both the off-gas consuming device and the off-gas storage vessel, (b) connecting, in a second state in which $p_b < p_i \leq p_o + \Delta$, each of the vessels directly to only the off-gas consuming device, and (c) connecting, in a third state in which $p_i < p_b$ and $p_o > p_b$, the off-gas storage vessel to the off-gas consuming device, wherein, $p_i$ represents the value of the pressure at the inlet, $p_o$ represents the value of the pressure in the off-gas storage vessel, $p_b$ represents a pressure having a predetermined value, and $\Delta$ represents a predetermined pressure difference.

The product gas separated in step (i) is usually stored in a product gas storage vessel, whereas a minor part thereof can be used for purging the vessels. Similarly, the purge gas released in step (ii) may be stored in a purge gas vessel, or can be carried to other vessels via a common outlet conduit, for the purpose of purging the other vessels.

In a process according to the invention the off-gas vessel is filled first in a first part of the blow-down (which involves a kind of pressure equalization between the adsorption vessel and the off-gas vessel) whereupon the off-gas vessel is bypassed. The gas consuming device, for instance a burner, then consumes the off-gas directly from the absorption vessel in blow-down until the pressure becomes too low for the burner requirements.

Actually, in contrast to the methods of the prior art discussed above, in the process according to the invention there is a phase during which the release of off-gas from the off-gas storage vessel is stopped when the absorber vessel is released.

As a consequence the pressure in the absorber vessel is reduced faster (or the off-gas vessel can be smaller) because all the off-gas for the burner is to be consumed directly from the absorption vessel, and not in parallel from the off-gas vessel. An important advantage is that the pressure inside the adsorption vessel in its blow-down step can be reduced to a lower pressure.

During the purge of a vessel the pressure is also reduced, because of the quicker pressure reduction when the burner is consuming only from the purge receiving vessel. If the supply of the purge is controlled, the whole purge can proceed at a pressure close to the minimum inlet pressure of the burner controls.

For instance, the gas mixture comprises hydrogen gas and the product gas is hydrogen.

The gas consuming device is for instance a burner.

The invention further relates to an apparatus for separating according to the method disclosed above a gas mixture according to a pressure swing adsorption process (PSA process), comprising a plurality of vessels, each vessel having at least one inlet and one outlet, in each of said vessels an adsorbent mass being provided for adsorbing at least one gas component, and the inlet of each of said vessels being connected to a storage vessel for an off-gas, wherein according to the invention the inlet of each of said vessels and the storage vessel are further connected to an off-gas consuming device.

In an embodiment of an apparatus according to the invention, control and connection means are provided for (a) in a first state, in which $p_i > p_o + \Delta$ and $p_i > p_b$, directly connecting each of the vessels to both the off-gas consuming device and the off-gas storage vessel, (b) in a second state, in which $p_b < p_i \leq p_o + \Delta$, directly connecting each of the vessels to only the off-gas consuming device, and (c) in a third state, in which $p_i<p_b$ and $p_o>p_b$, connecting the off-gas storage vessel to the off-gas consuming device, wherein, $p_i$ represents the value of the pressure at the inlet, $p_o$ represents the value of the pressure in the off-gas storage vessel, $p_b$ represents a pressure having a predetermined value, and $\Delta$ represents a predetermined pressure difference.

In an embodiment of the latter apparatus, each inlet is connected to the off-gas consuming device by a common conduit having a first control device, which is provided with a bypass conduit having a check valve, a branch conduit connected to the off-gas storage vessel and a second control device.

The first and second control device are for instance a pressure reducer valve, or are for instance a control valve.

In another embodiment of the apparatus, each inlet is connected to the off-gas consuming device by a common conduit which is provided with a first control device and with a bypass conduit extending between the inlets and said first control device and having check valve, a branch connected to the off-gas storage vessel and a second control device.

In yet another embodiment of the apparatus, each inlet is connected to the off-gas consuming device by a common conduit, the common conduit being connected to the off-gas storage vessel via a branch conduit in which a first pressure sensor, a valve and a second pressure sensor are provided.

In yet another embodiment of the apparatus, each inlet is connected to the off-gas consuming device by a common conduit which is provided with a first control device, which is provided with a by-pass conduit which leads through the off-gas vessel and has a second control device.

BRIEF DESCRIPTION OF THE DRAWINGS

The invention will be elucidated in the following on the basis of embodiments, with reference to the drawings.

In the drawings.

DETAILED DESCRIPTION

Figure 1:
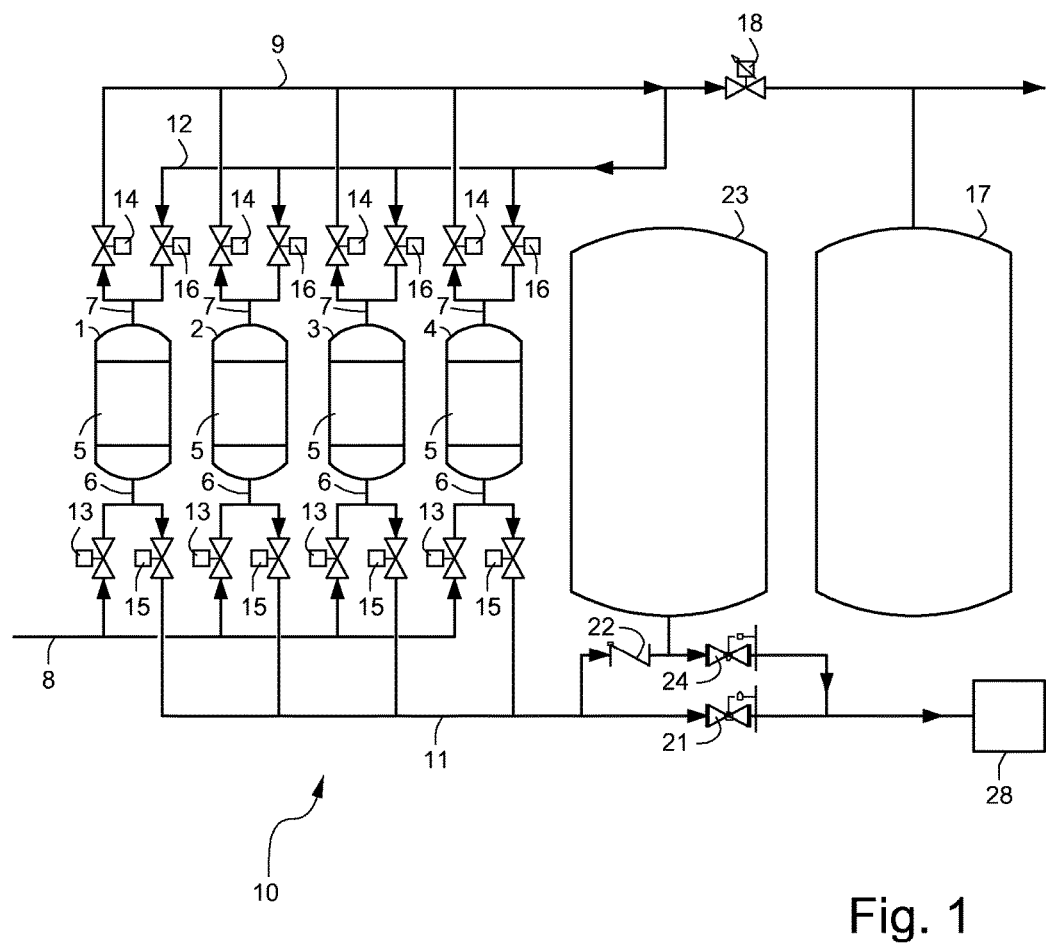
FIG. 1 shows a schematic representation of a first embodiment of an apparatus according to the invention.

FIG. 1 shows a PSA apparatus 10, comprising four vessels 1, 2, 3, 4, each containing an adsorbent mass 5, and each having an inlet 6 and an outlet 7. The vessels 1, 2, 3, 4 are connected to four parallel manifolds, namely a feed manifold 8 for the gas mixture, a product manifold 9, an off-gas manifold 11 and an equalization and purge manifold 12, in which manifolds for each of the vessels 1, 2, 3, 4 is provided a feed valve 13, a product valve 14, an off-gas valve 15 and an equalization and purge valve 16 respectively. Further shown are a product vessel 17 with valve 18. The off-gas from the vessels 1, 2, 3, 4 either can be fed directly through the manifold 11 and a first pressure reducer 21 to a burner 28, or can be stored via a check valve 22 in an off-gas vessel 23, from which it can be fed via a second pressure reducer 24 to the burner 28. In an operative situation, the second pressure reducer 24 is set at a slightly lower pressure, for instance 100 mbarg, whereas the first pressure reducer 21 is set at a slightly higher pressure, for instance 110 mbarg.

When the pressure in the off-gas manifold 11 is higher than the pressure inside the off-gas vessel 23, the check valve 22 will be opened and the off-gas vessel 23 will be filled until the respective vessels 23, 1, 2, 3, 4 have equal pressures. In the meantime the burner 28 will consume fuel directly from the respective vessels 1, 2, 3, 4 until the pressure at the inlet of the first pressure reducer 21 is not sufficient to maintain the slightly higher burner pressure. At this point the pressure after the first pressure reducer 21 reduces until the value of the second pressure reducer 24 is reached, and the second pressure reducer 24 controls the pressure by adding fuel from the off-gas vessel 23.

Figure 2:
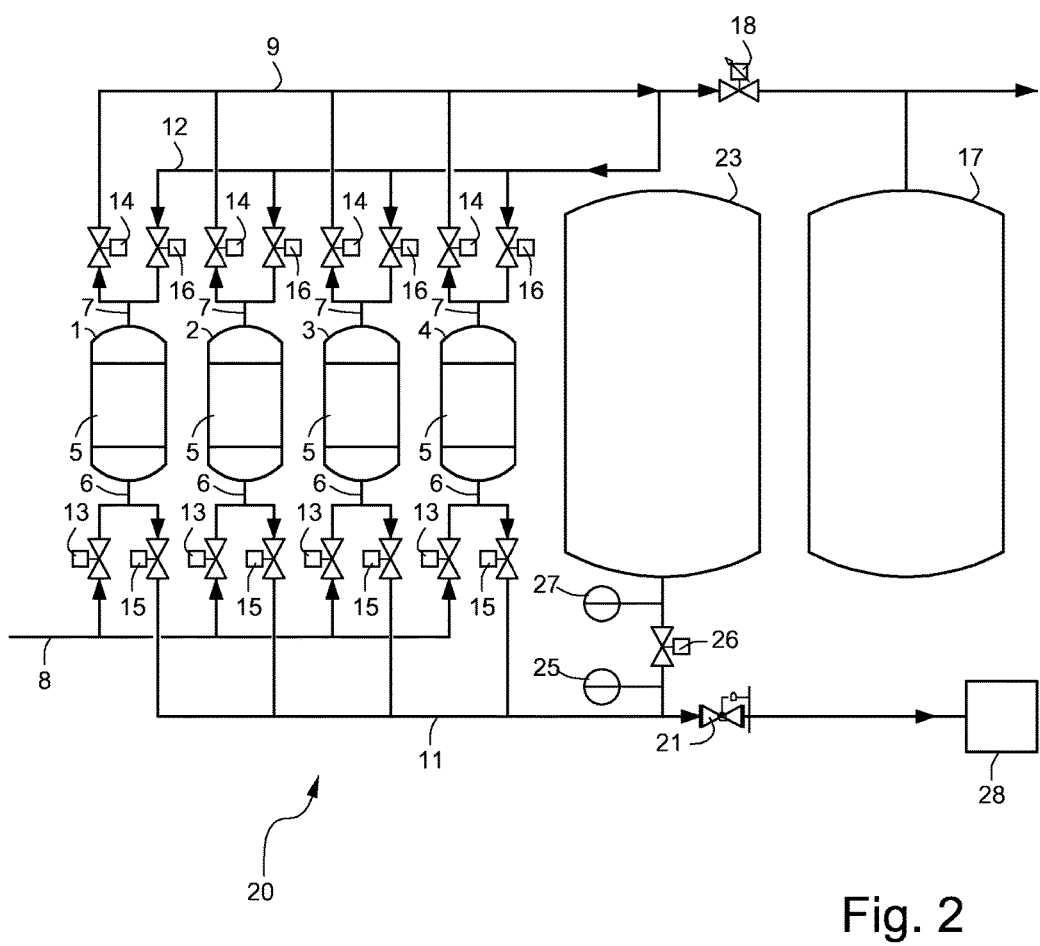
FIG. 2 shows a schematic representation of a second embodiment of an apparatus according to the invention Corresponding components are designated in the figures with the same reference numerals.

FIG. 2 shows a PSA apparatus 20, which is different from the apparatus 10 in FIG. 1, in that the off-gas manifold 11 is connected to the off-gas storage vessel 23 via a branch conduit in which a first pressure sensor 25, a valve 26 and a second pressure sensor 27 are provided.

When the pressure in the off gas vessel 23 as measured by the second pressure sensor 27 is higher than the pressure in the off-gas manifold 11, as measured by the first pressure sensor 25, the off gas-vessel valve 23 is opened and the off-gas vessel 23 is filled. When the pressure in the off-gas manifold 11 is reduced below a certain value, the valve is opened and the off gas valves 15 of the respective the PSA vessels 1, 2, 3, 4 are closed.

In both apparatus 10, 20, during the purge of a vessel 1, 2, 3, 4 the pressure is also reduced because of the quicker pressure reduction when the burner 28 is consuming only from the respective purge giving vessel. If the supply of the purge is controlled, the whole purge can proceed at a pressure close to the minimum inlet pressure of the burner controls.

The invention claimed is:

1. Method for separating a gas mixture according to a pressure swing adsorption process (PSA process), comprising the steps of:

separating the gas mixture by adsorbing at least one gas component in an adsorbent mass provided in each vessel of a plurality of vessels, wherein each vessel has at least one inlet and one outlet; and storing off-gas from said process into an off-gas vessel, wherein in each of said plurality of vessels the following steps are conducted, (i) admitting the gas mixture for a specified period into a first vessel via an inlet of said vessel, and releasing a separated product gas via an outlet of said vessel, to be followed by admitting the gas mixture into a second vessel while continuing the release of product gas from the first vessel, to be followed by (ii) releasing purge gas from the first vessel via its outlet, (iii) releasing off-gas from the first vessel via its inlet and admitting at least part of the off-gas into the off-gas vessel, (iv) admitting purge gas into the first vessel via its outlet, and releasing off-gas from said vessel via its inlet, (v) admitting a separated product gas into the first vessel until the pressure in the first vessel has reached a predetermined value, after which admitting of the gas mixture into the first vessel begins, and the steps are to be repeated beginning with the step (i), wherein during at least one of the steps (iii) and (iv) at least part of the off-gas from the first vessel is released directly to an off-gas consuming device, characterized by (a) connecting, in a first state in which $pi>po+\Delta$ and $pi>pb$, each of the plurality of vessels directly to both the off-gas consuming device and the off-gas storage vessel, (b) connecting, in a second state in which $pb<pi<po+\Delta$, each of the plurality of vessels directly to only the off-gas consuming device, and (c) connecting, in a third state in which pi<pb and po>pb, the off-gas storage vessel to the off-gas consuming device, wherein pi represents the value of the pressure at the inlet of the respective one of the plurality of vessels, po represents the value of the pressure in the storage vessel, pb represents a pressure having a predetermined value, and Δ represents a predetermined pressure difference.

2. Method as claimed in claim 1, wherein the gas mixture comprises hydrogen gas and the product gas is hydrogen.

3. Method as claimed in claim 1, wherein the off-gas consuming device comprises a burner.

4. Apparatus for separating a gas mixture according to a pressure swing adsorption process (PSA process), comprising a plurality of vessels, wherein each vessel has at least one inlet and one outlet, an adsorbent mass is provided in each of said vessels for adsorbing at least one gas component, and the inlet of each of said vessels is connected to a storage vessel for an off-gas, wherein the inlet of each of said plurality of vessels and the storage vessel are further connected to an off-gas consuming device, and wherein control and connection means are provided for (a) in a first state, in which pi>po+Δ and pi>pb, directly connecting each of the plurality of vessels to both the off-gas consuming device and the off-gas storage vessel, (b) in a second state, in which pb<pi<po+Δ, directly connecting each of the plurality of vessels to only the off-gas consuming device, and (c) in a third state, in which pi<pb and po>pb, connecting the off-gas storage vessel to the off-gas consuming device, wherein pi represents the value of the pressure at the inlet, po represents the value of the pressure in the storage vessel, pb represents a pressure having a predetermined value, and Δrepresents a predetermined pressure difference.

5. Apparatus as claimed in claim 4, wherein each inlet is connected to the off-gas consuming device by a common conduit having a first control device, which is provided with a bypass conduit having a check valve, a branch conduit connected to the off-gas storage vessel and a second control device.

6. Apparatus as claimed in claim 5, wherein the first control device is a pressure reducing device and the second control device is a pressure reducing device.

7. Apparatus as claimed in claim 5, wherein the first control device is a control valve and the second control device is a control valve.

8. Apparatus as claimed in claim 5, wherein the first control device is a control valve and the second control device is a pressure regulator.

9. Apparatus as claimed in claim 8, wherein the pressure regulator comprises a pressure reducer valve and a control valve.

10. Apparatus as claimed in claim 4, wherein each inlet is connected to the off-gas consuming device by a common conduit which is provided with a first control device and with a bypass conduit extending between the inlets and said first control device and having a check valve, a branch connected to the off-gas storage vessel and a second control device.

11. Apparatus as claimed in claim 4, wherein each inlet is connected to the off-gas consuming device by a common conduit, the common conduit being connected to the off-gas storage vessel via a branch conduit in which a first pressure sensor, a valve and a second pressure sensor are provided.

12. Apparatus as claimed in claim 4, wherein each inlet is connected to the off-gas consuming device by a common conduit which has a first control device, which is provided with a by-pass conduit which leads through the off-gas vessel and has a check valve and a second control device.

13. Apparatus as claimed in claim 4, wherein the plurality of vessels includes at least two vessels.

14. Apparatus as claimed in claim 4, wherein the plurality of vessels includes four vessels.

15. Apparatus as claimed in claim 4, wherein the off-gas consuming device includes a burner.

\* \* \* \* \*